United States Patent
Ryu

(10) Patent No.: US 8,724,704 B2
(45) Date of Patent: May 13, 2014

(54) APPARATUS AND METHOD FOR MOTION ESTIMATION AND IMAGE PROCESSING APPARATUS

(75) Inventor: Kwang-Yuel Ryu, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 502 days.

(21) Appl. No.: 12/962,091

(22) Filed: Dec. 7, 2010

(65) Prior Publication Data

US 2011/0200107 A1    Aug. 18, 2011

(30) Foreign Application Priority Data

Feb. 17, 2010    (KR) .................. 10-2010-0014373

(51) Int. Cl.
*H04N 7/26*    (2006.01)
*H04B 1/66*    (2006.01)
*H04N 11/02*    (2006.01)
*H04N 7/12*    (2006.01)

(52) U.S. Cl.
USPC ............ 375/240.16; 375/240.12; 375/240.14; 375/240.24; 375/240.26

(58) Field of Classification Search
USPC ............... 375/240.16; 348/208.99, 222.1; 702/150
IPC ......................................................... H04N 7/26
See application file for complete search history.

(56) References Cited

U.S. PATENT DOCUMENTS

| 7,555,166 | B2 | 6/2009 | Lee et al. | |
|---|---|---|---|---|
| 2003/0086498 | A1* | 5/2003 | Lee et al. | 375/240.16 |
| 2003/0123551 | A1* | 7/2003 | Kim | 375/240.16 |
| 2003/0163281 | A1* | 8/2003 | Yang | 702/150 |
| 2003/0194010 | A1* | 10/2003 | Mukerjee et al. | 375/240.16 |
| 2006/0193388 | A1* | 8/2006 | Woods et al. | 375/240.16 |
| 2007/0121726 | A1* | 5/2007 | Lee et al. | 375/240.16 |
| 2007/0237232 | A1 | 10/2007 | Chang et al. | |
| 2008/0226193 | A1 | 9/2008 | Mishima et al. | |
| 2009/0051777 | A1* | 2/2009 | Lee et al. | 348/208.99 |
| 2009/0278953 | A1* | 11/2009 | Velthoven et al. | 348/222.1 |

FOREIGN PATENT DOCUMENTS

| JP | 2006033433 | 2/2006 |
|---|---|---|
| JP | 2008226187 | 9/2008 |
| KR | 1020050014569 | 2/2005 |
| KR | 1020090003300 | 1/2009 |
| KR | 1020090019197 | 2/2009 |

OTHER PUBLICATIONS

Ghangming Hong et al., SenseCoding: Accelerometer-Assisted Motion Estimation for Efficient Video Encoding, Proc ACM Multimedia, Oct. 2008, Vancouver, CA.

* cited by examiner

*Primary Examiner* — Thao X Le
*Assistant Examiner* — Long Le
(74) *Attorney, Agent, or Firm* — The Farrell Law Firm, P.C.

(57) ABSTRACT

A motion estimation apparatus and method for quickly performing video encoding based on a user input through a user input device are provided. The motion estimation apparatus includes an input receiver for receiving a user input, an input pattern analysis unit for analyzing the received user input and determining a user input pattern according to the analyzed user input, a storage for storing history information of a motion vector according to the user input pattern, and a motion estimator for initially estimating a motion vector of a motion estimation block of a current frame with reference to history information of a motion vector corresponding to the user input pattern stored in the storage, deciding a search location of a block matching the motion estimation block from a reference frame, and performing motion estimation on the motion estimation block using the decided search location.

20 Claims, 9 Drawing Sheets

LOCAL MV HISTORY INFORMATION STORAGE

| BLOCK LOCATION | INPUT TYPE | INPUT VALUE | MV HISTORY INFORMATION |
|---|---|---|---|
| (1,1) | KEYBOARD | LEFT_ARROW | {(-1,3),(-5,1),(-4,-1),(0,1)} |
| | | UP_ARROW | {(-2,1),(-3,-1),(2,1),(-1,2)} |
| | | ... | ... |
| | MOUSE | MOVE_UP | {(-1,3),(-5,1),(-4,-1),(0,1)} |
| | | MOVE_DOWN | {(-2,1),(-3,-1),(2,1),(-1,2)} |
| | | ... | ... |
| | ... | ... | ... |
| ... | ... | ... | ... |

FIG. 4

GLOBAL MV HISTORY INFORMATION STORAGE 144

| INPUT TYPE | INPUT VALUE | MV HISTORY INFORMATION |
|---|---|---|
| KEYBOARD | LEFT_ARROW | {(-1,3),(-5,1),(-4,-1),(0,1)} |
| | UP_ARROW | {(-2,1),(-3,-1),(2,1),(-1,2)} |
| | ... | ... |
| MOUSE | ... | ... |
| ... | ... | ... |

APPARATUS AND METHOD FOR MOTION ESTIMATION AND IMAGE PROCESSING APPARATUS

This application claims priority under 35 U.S.C. §119(a) to a Korean Patent Application filed in the Korean Intellectual Property office on Feb. 17, 2010 and assigned Serial No. 10-2010-0014373, the entire disclosure of which is incorporated herein by reference.

BACKGROUND OF THE INVENTION

1. Field of the Invention

The present invention relates generally to an apparatus and method for image processing, and more particularly, the present invention relates to an apparatus and method for performing video encoding using motion estimation.

2. Description of the Related Art

With the development of cloud computing and remote desktop programs, various methods of transmitting images remotely have been introduced. Before transmitting data, conventional remote desktops compress the data using a video encoding technique in order to reduce the amount of data transmitted. This compression is especially useful for transmission of complex video with largely varying images, such as video corresponding to video games, three-dimensional (3D) graphic programs, video from video player programs, etc. Processing for encoding large amounts of video data, such as in the above-described complex videos, requires a lot of time, which makes it difficult to guarantee real-time transmission of encoded and/or compressed video data.

SUMMARY OF THE INVENTION

An aspect of embodiments of the present invention is to address at least the problems and/or disadvantages described above and to provide at least the advantages described below. Accordingly, an aspect of embodiment of the present invention is to provide a motion estimation apparatus and method for quickly performing video encoding based on a user input through a user input device, and an image processing apparatus including the motion estimation apparatus.

In accordance with an aspect of the present invention, there is provided a motion estimation apparatus. The apparatus includes an input receiver for receiving user input; an input pattern analysis unit for analyzing the received user input and determining a user input pattern according to the analyzed user input; a storage for storing history information of a motion vector according to the user input pattern; and a motion estimator for initially estimating a motion vector of a motion estimation block of a current frame with reference to the history information of the motion vector corresponding to the user input pattern stored in the storage, deciding a search location of a block matching the motion estimation block from a reference frame using the initially estimated motion vector, and performing motion estimation on the motion estimation block using the decided search location.

In accordance with another aspect of the present invention, there is provided an image processing apparatus. The apparatus includes a communication unit for communicating with a terminal through a network; a virtualized user input unit for receiving user input transmitted from the terminal through the communication unit; an application execution unit for executing an application according to the user input and creating a plurality of image frames; and an encoder for encoding the plurality of image frames. The encoder performs motion estimation on each block of a current frame by analyzing the user input, determining a user input pattern according to the analyzed user input, initially estimating a motion vector of a motion estimation block of the current frame using history information of a motion vector corresponding to the user input pattern, and deciding a search location of a block matching the motion estimation block from a reference frame using the initially estimated motion vector.

In accordance with another aspect of the present invention, there is provided a motion estimation method. The method includes receiving a user input; analyzing the received user input; determining a user input pattern according to the analyzed user input; initially estimating a motion vector of a motion estimation block of a current frame with reference to history information of a motion vector corresponding to the user input pattern, wherein the user input pattern is stored in a storage that stores motion vector history information according to user input patterns; deciding a search location of a block matching the motion estimation block from a reference frame, using the initially estimated motion vector; and performing motion estimation on the motion estimation block using the decided search location.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIG. 3 illustrates a configuration example of a local motion vector history information storing unit included in a storage of FIG. 1 according to an embodiment of the present invention;

FIG. 4 illustrates a configuration example of a global motion vector history information storing unit included in the storage of FIG. 1 according to an embodiment of the present invention;

Throughout the drawings, the same drawing reference numerals will be understood to refer to the same elements, features, and structures. The relative size and depiction of these elements may be exaggerated for clarity, illustration, and convenience.

DETAILED DESCRIPTION OF EMBODIMENTS OF THE PRESENT INVENTION

The following description is provided to assist a comprehensive understanding of the methods, apparatuses, and/or systems described herein. Accordingly, those of ordinary skill in the art will recognize that various changes, modifications, and equivalents of the methods, apparatuses, and/or systems described herein can be made without departing from the scope and spirit of the invention. Also, descriptions of well-known functions and constructions may be omitted for increased clarity and conciseness.

Figure 1:
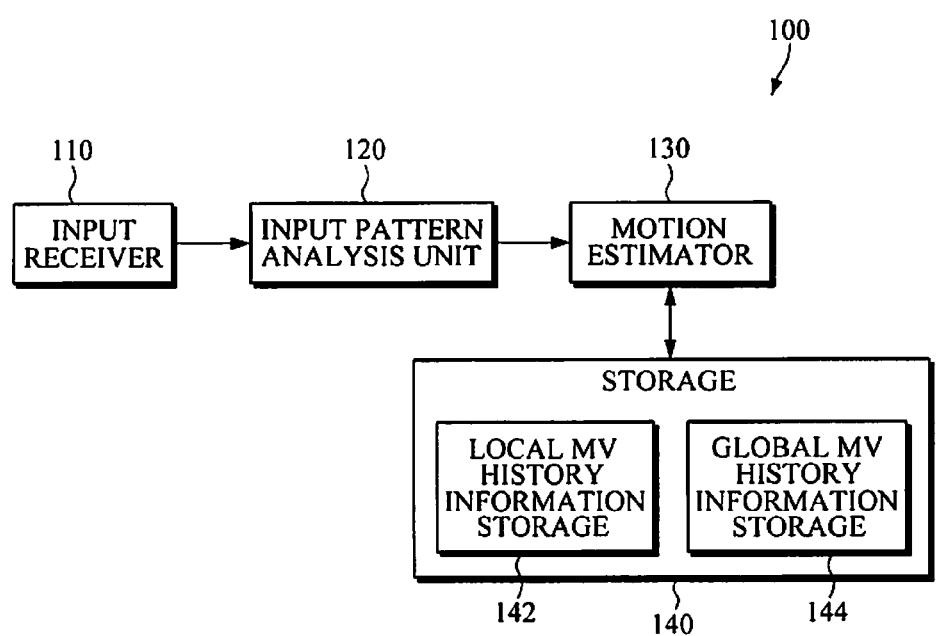
FIG. 1 is a diagram illustrating an example of a motion estimation apparatus according to an embodiment of the present invention.

FIG. 1 is a diagram illustrating an example of a motion estimation apparatus according to an embodiment of the present invention.

Referring to FIG. 1, a motion estimation apparatus 100 includes an input receiver 110, an input pattern analysis unit 120, a motion estimator 130, and a storage 140.

The input receiver 110 receives user input. The input receiver 110 is configured to receive user input signals created by a user input device, such as a keyboard, a touch pad, a joystick, or a remote controller, etc. A user input signal may be packetized and transmitted to the input receiver 110 through a network. For example, the user input may be input through a single key or button, or input through several keys or buttons.

The input pattern analysis unit 120 analyzes the received user input and decides a user input pattern. The input pattern analysis unit 120 identifies the type of a user input device and an input value according to the type of the user input device from the user input signal and determines the user input pattern based on the type of user input device and the input value. Analysis of an input pattern may be performed on a user's transient input signal or on a combination of user's input signals received during a certain time interval.

The user input signal may include type information indicating the type of a user input device and an input value, which may include one or more values according to the type of the user input device. When the input pattern is a mouse input, the input value may further indicate a location of the mouse or a location change corresponding to a unit of time. The input value may be a real input value input through a user input device or a value obtained by processing a real input value input through a user input device. For example, the input value may be a mouse input value that is acquired as a representative value indicating a range of location changes in a unit of time.

The motion estimator 130 performs motion estimation on a received frame. The motion estimation may be performed in units of blocks with respect to a reference frame.

Figure 2:
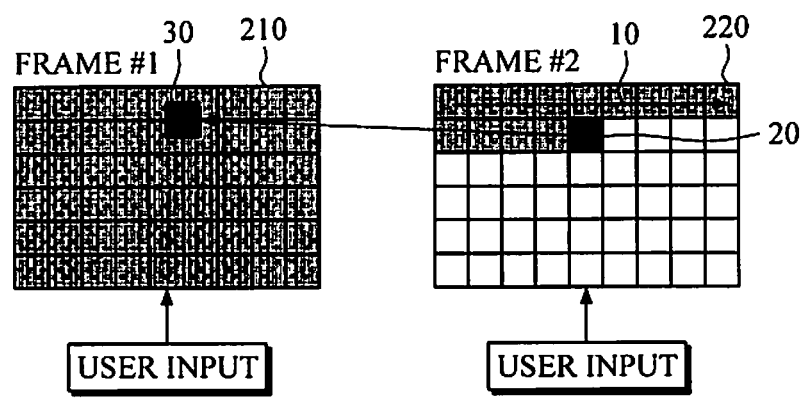
FIG. 2 is a diagram illustrating explaining an example of a method of estimating a motion vector for each block according to an embodiment of the present invention.

FIG. 2 is a diagram illustrating an example of a method of estimating a motion vector for each block according to an embodiment of the present invention. Referring to FIG. 2, motion estimation, which is denoted by an arrow 10 in a frame #2 220, is generally performed in units of blocks of a certain size in a direction from the upper-left part of the frame #2 220 toward the lower-right part of the frame #2 220. A block on which motion estimation is performed is referred to as a motion estimation block. For example, various block matching algorithms may be used to find a block most similar to a motion estimation block 20 of the frame #2 220 from a frame #1 210, which is a reference frame. In the present example, block 30 in frame #1 210, is determined to be the block most similar to a motion of the estimation block 20 of the frame #2 220.

The various block matching algorithms may include a full search method, a 3-step search method, a diamond search method, a hexagon-based search method, etc. The full search method compares a motion estimation block of a current frame with all blocks of a reference frame to extract a block having the smallest Sum of Absolute Differences (SAD) between pixels with respect to the motion estimation block from the reference frame. Other block matching algorithms may reduce the amount of calculations by reducing the number of the motion estimation block of reference frames used to calculate SADs with respect to a motion estimation block.

Referring to FIG. 1, the motion estimator 130 receives the input pattern determined by the input pattern analyzer 120 and may perform motion estimation according to the input pattern. Conventional motion estimation methods, which are performed based on input images, do not consider any factors that influence the creation of input images. By contrast, in the current example according to an embodiment of the present invention, since the motion estimator 130 performs motion estimation in consideration of a user input signal, when the user input is used to create input images, motion estimation may be performed more efficiently than conventional motion estimation.

In order to perform motion estimation based on user input, the motion estimator 130 may store block-based motion vector information, which is acquired as the result of the block-based motion estimation, as motion vector history information, in the storage 140.

The storage 140 stores the motion vector history information in according to user input patterns. The storage 140 may include a local motion vector history information storing unit 142 and a global motion vector history information storing unit 144.

The local motion vector history information storing unit 142 may store location motion vector history information that represents histories of motion vectors for individual blocks. The global motion vector history information storing unit 144 may store global motion vector history information that represents histories of global motion vectors for individual frames.

The motion estimator 130 initially estimates a motion vector of the motion estimation block, with reference to the motion vector history information stored in the storage 140, and decides a search location of a block matching the motion estimation block from a reference frame, using the initially estimated motion vector. The motion estimator 130 may perform block-based motion estimation on a received image frame using the decided search location.

For example, when estimating a motion of the motion estimation block, the motion estimator 130 may set a certain range based on the search location decided from the reference frame, and apply the full search algorithm to the range. For example, the motion estimator 130 may set a certain range centered on the search location. Alternatively, the motion estimator 130 may execute a search algorithm, such as the 3-step search method, the diamond search method or the hexagon-based search method, based on the search location decided from the reference frame.

The motion estimator 130 may perform motion estimation based on a user input as necessary, while performing general motion estimation. For example, when no motion vector history information is accumulated in the storage 140, the motion estimator 130 may perform general motion estimation using only frame information, in a manner similar to an initial motion estimation. When errors are accumulated upon motion estimation based on a user inputs, the motion estimator 130 may perform general motion estimation periodically, or whenever predetermined number of frames is processed.

The motion estimator 130 may estimate motion vectors of a predetermined number of blocks in a current frame and when a standard deviation between the estimated motion vectors is less than a threshold value, the motion estimator 130 may determine that a global motion vector exists in the current frame. Then, the motion estimator 130 may perform initial motion estimation with reference to the global motion vector history information.

The motion estimator 130 may perform, when finding a predetermined pattern between a plurality of motion vector values included in local motion vector history information of a block corresponding to the motion estimation block, an initial estimation with reference to the local motion vector information. For example, when the amount of changes between a plurality of motion vector values included in local motion vector history information of a block corresponding to the motion estimation block is less than a threshold value, the motion estimator 130 may determine that a predetermined pattern exists in the plurality of motion vector values, and then perform initial estimation using the amount of changes between the plurality of motion vectors.

The motion estimator 130 may perform initial estimation by assigning weights to the to plurality of motion vector values included in the motion vector history information such that the larger weights are assigned to the more recently updated motion vector values. Then, the weighted motion vector values may be averaged.

The motion estimator 130 may manage information stored in the storage 140. For example, the motion estimator 130 may perform motion estimation on the motion estimation block based on the search location decided from the reference frame to create a motion vector of the motion estimation block, and store the motion vector of the motion estimation block as an updated motion vector of the corresponding block in the storage 140. When the motion vector history information stored in the storage 140 is accumulated such as to exceed a predetermined threshold amount, the motion estimator 130 may delete old motion vector information from the motion vector history information.

Since motion estimation is performed using a block search location based on a user input signal upon video encoding, motion estimation may be performed quickly. Accordingly, when video data is determined to have large weights as a result of the motion estimation, encoding of the video data may be performed quickly and efficiently.

FIG. 3 illustrates a configuration example of the local motion vector history information storing unit 142 included in the storage 140 of FIG. 1 according to an embodiment of the present invention.

Referring to FIG. 3, the local motion vector history information storing unit 142 stores motion vectors for input types and input values in association with blocks. Input types and values input through various input devices, such as a keyboard and a mouse, may be used to configure the local motion vector history information.

For example, when a keyboard input corresponding to an input value "Left_arrow" is received, motion vector history information of {(−1, 3), (−5, 1), (−4, −1), (0, 1)} may be stored. In the above sequence, as well as other sequences described with reference to FIGS. 3-5, the values are listed from left to right, in order from oldest history information to newest history information.

FIG. 4 is a diagram illustrating a configuration example of the global motion vector history information storing unit 144 included in the storage 140 of FIG. 1 according to an embodiment of the present invention.

Referring to FIG. 4, the global vector history information stored in the global motion vector history information storing unit 144 is used to check whether a global motion vector for a received frame exists. The global motion vector history information may be set and stored in advance. Alternatively, the motion estimator 130 may calculate and update the global motion vector history information in real time (see FIG. 1). Input types and values input through various input devices, such as a keyboard and a mouse, may be used to configure global motion vector history information. As illustrated in FIG. 4, the global motion vector history information storing unit 144 stores global motion vectors for input types and input values in association with input types.

Figure 5:
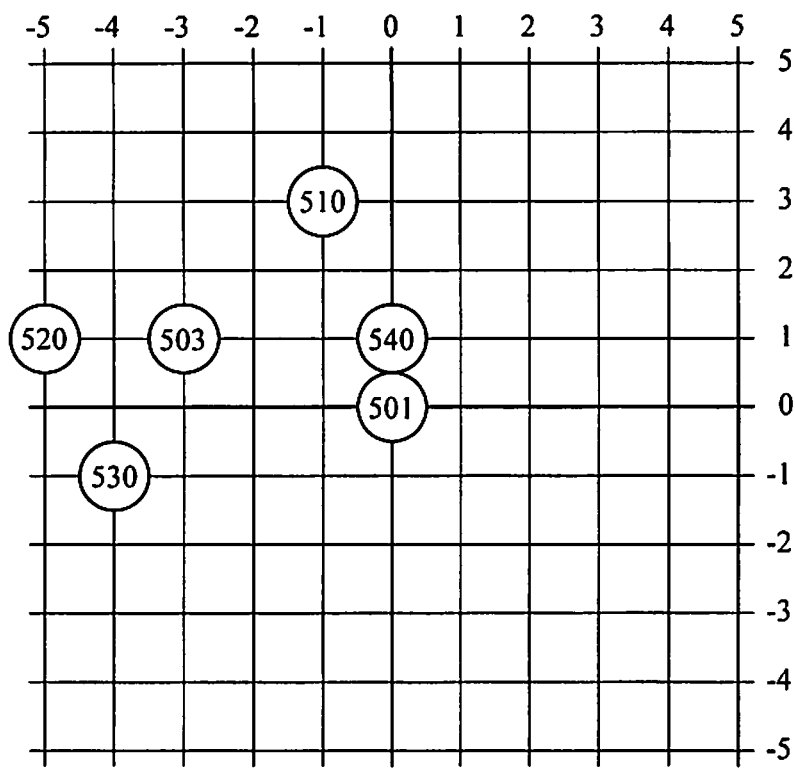
FIG. 5 is a view for explaining an example of a method of initially predicting a motion vector for a motion estimation block in the motion estimation apparatus illustrated in FIG. 1 according to an embodiment of the present invention.

FIG. 5 is a diagram illustrating an example of a method of initially predicting a motion vector for a motion estimation block in the motion estimation apparatus 100 illustrated in FIG. 1 according to an embodiment of the present invention.

Referring to FIG. 5, the motion estimator 130 (see FIG. 1) performs motion estimation with respect to a current block 501, and local motion vector history information for a location corresponding to the current block 501 is {(−1, 3), (−5, 1), (−4, −1) (0, 1)}.

In FIG. 5, motion vector values are denoted by reference numbers 510, 520, 530, and 540. The motion estimator 130 may assign weights to motion vectors included in the local motion vector history information such that a sum of the weights is "1". The motion estimator 130 may assign higher weights to the more recent motion vectors. For example, the motion estimator 130 may assign a weight 0.4 to a motion vector (−1, 3), a weight 0.3 to the motion vector (−5, 1), a weight 0.2 to a motion vector (−4, −1) and a weight 0.1 to a motion vector (0, 1). A sum of the motion vectors to which the weights are assigned reaches (−2.7, 1.4). (−2.7, 1.4) is rounded off to (−3, 1) which corresponds to a block 503 in FIG. 5.

The motion estimator 130 may apply a block matching algorithm to a reference frame based on the block 503 at the location (−3, 1). For example, the motion estimator 130 may set a predetermined range centered on the location of the block 503 on the reference frame and perform the full search method within the predetermined range, or may perform the 3-step search method, the diamond search method or the hexagon-based search method, starting from the block 503.

Figure 6:
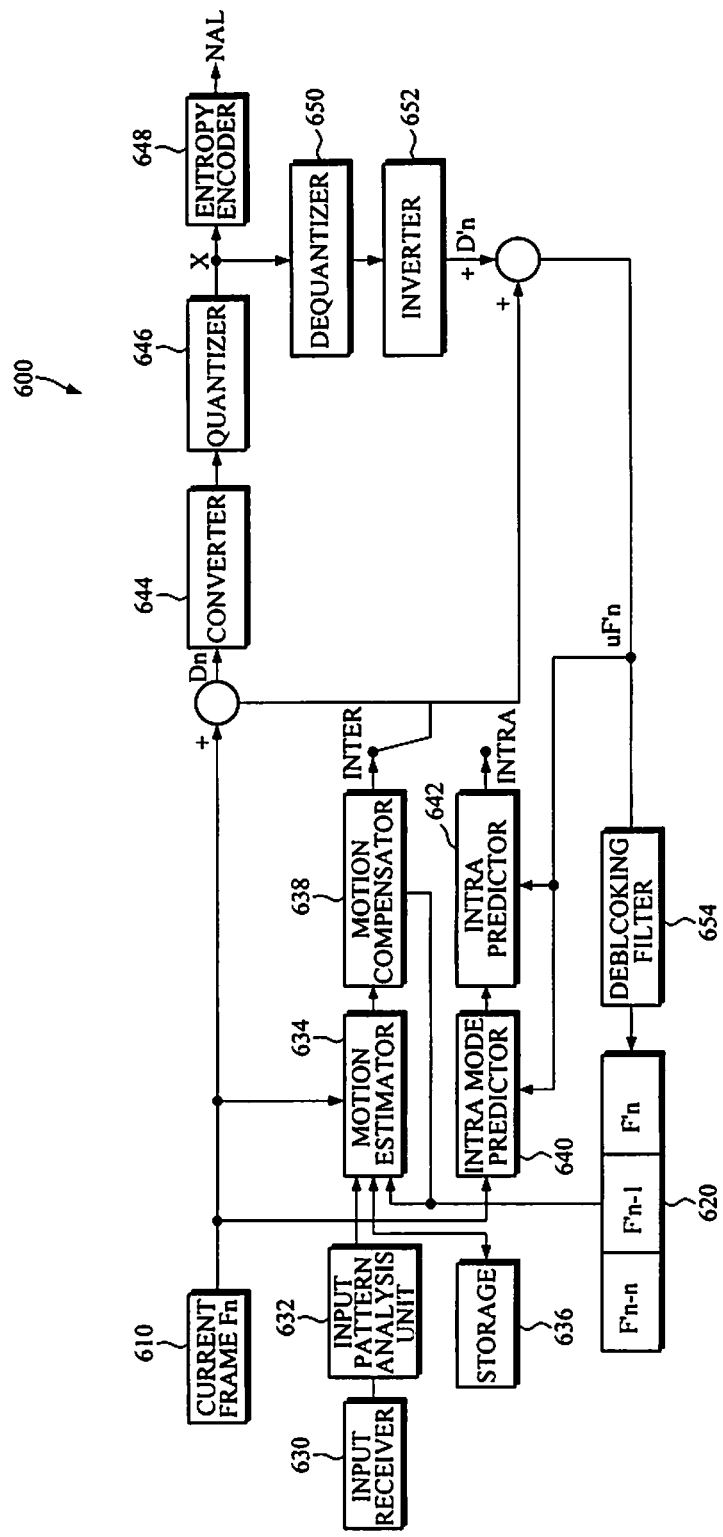
FIG. 6 is a diagram illustrating an example of an image processing apparatus including the motion estimation apparatus illustrated in FIG. 1 according to an embodiment of the present invention.

FIG. 6 is a diagram illustrating an example of an image processing apparatus 600 including the motion estimation apparatus 100 illustrated in FIG. 1 according to an embodiment of the present invention.

The image processing apparatus 600 is an encoding apparatus which performs H.264 encoding on frames using a motion estimator 620 based on user input.

Referring to FIG. 6, the image processing apparatus 600 includes an input receiver 630, an input pattern analysis unit 632, a motion estimator 634, a storage 636, a motion compensator 638, an intra mode predictor 640, an intra predictor 642, a converter 644, a quantizer 646, an entropy encoder 648, a dequantizer 650, an inverter 652 and a deblocking filter 654. In the following description with reference to FIG. 6, frame 610 represents a current frame and frame 620 represents a reference frame.

The input receiver 630, the input pattern analysis unit 632, the motion estimator 634 and the storage 636 correspond to the input receiver 110, the input pattern analysis unit 120, the motion estimator 130 and the storage of FIG. 1, respectively, and therefore, further detailed descriptions of these components is omitted.

The motion estimator 634 searches for a motion vector from a plurality of reference frames 620 and searches for a macroblock mode type. The motion compensator 638 acquires a compensated image from the reference frames 620 according to the motion vector and macroblock mode type found by the motion estimator 634.

The intra mode predictor 640 performs prediction using adjacent blocks upon intra-coding of a macro block to select an optimal intra prediction mode. In the case of an intra 16×16 block, four prediction modes exist and in intra 4×4 mode, 9 the case of an prediction modes exist.

The intra predictor 641 acquires a compensated image by intra-prediction from the previously coded adjacent blocks using the intra prediction mode selected by the intra mode predictor 640.

The converter 644 performs a 4×4 integer transform, which is a modification of a 4×4 Discrete Cosine Transform (DCT). The quantizer 646 quantizes coefficients converted by the converter 644. Since the 4×4 integer transform defined in the H.264 standard does not have orthogonality, the 4×4 integer transform needs quantization compensation. Accordingly, the converter 644 is used together with the quantizer 646. The inverter 652 and the dequantizer 650 perform the inverse operations of the converter 644 and quantizer 646. The image output from the inverter 652 is a restored image in a state before filtering through the deblocking filter 654.

The entropy encoder 648 performs entropy encoding using bit allocation depending on the generation probability of quantized DCT coefficients.

The deblocking filter 654 enhances the picture quality of the restored image received from the inverter 652. The enhanced image is used as a reference frame 620 for subsequent images.

The H.264 standard, like existing Motion Picture Experts' Group (MPEG) standards, defines I_Slice, P_Slice, B_Slice, SI_Slice, SP_Slice, etc. The H.264 standard performs encoding in units of slices. For convenience of description, a slice may be considered equivalent to a frame, i.e., the I_Slice is similar to the I_picture defined in the existing MPEG standard, the P_Slice is similar to P_picture defined in the existing MPEG standard, and the B_Slice is similar to B_picture defined in the existing MPEG standard, and the SI_Slice and SP_Slice are used for particular purposes.

When I_Slice is received, neither the motion estimator 634 nor the motion compensator 638 operates, and the intra mode predictor 640 and the intra predictor 642 optimally perform intra prediction. The result of the intra prediction is acquired as a difference image between the compensated image and the original image. Then, the acquired difference image is input to the converter 644 and the quantizer 646, thereby acquiring a quantized DCT coefficient. The entropy encoder 648 performs entropy encoding on the quantized DCT coefficient, thus creating a bit string.

After the bit string is created, next slices are subjected to the dequantizer 650 and the inverter 652 to restore a difference image. Then, the restored the difference image is combined with a compensated image, thus creating a restored image. The restored image is used as a reference frame 620 after passing through the deblocking filter 654. In the present example, images to be subjected to intra prediction have not passed through the deblocking filter 654.

When a P_Slice is received, the motion estimator 634 and the motion compensator 638 decide an optimal motion vector for the P_Slice and a macro block mode. Then, the inter mode predictor 640 and the intra predictor 642 optimally perform intra prediction. Thereafter, the execution result from the motion compensator 638 is compared with the execution result from the intra predictor 642 to select one of the two execution results as a compensated image. The following B_Slice operations are similar to the above-described operations in association with I_Slice.

When B_Slice is received, the B_Slice is processed in a manner similar to processing for the P_Slice, except that, for the B_Slice, future images as well as previous images are used as reference images when the motion predictor 634 and the motion compensator 638 are executed.

Figure 7:
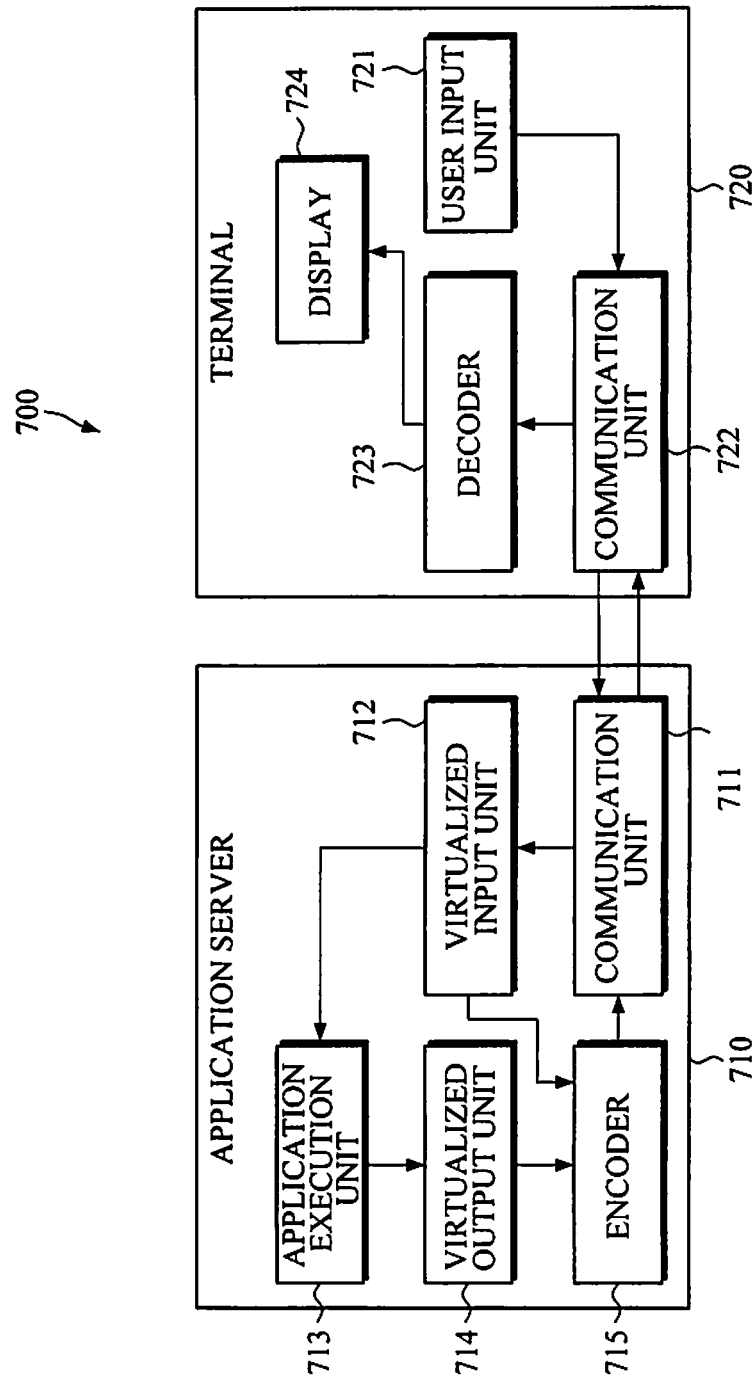
FIG. 7 is a diagram illustrating an example of a system of providing video services using the motion estimation apparatus illustrated in FIG. 1 according to an embodiment of the present invention.

FIG. 7 is a diagram illustrating an example of a system 700 of providing video services using the motion estimation apparatus illustrated in FIG. 1 according to an embodiment of the present invention.

The system 700 of providing video services includes an application server 710 and a terminal 720. The application server 710 and the terminal 720 may be connected to each other through a wired or wireless network.

The application server 710 executes an application requested by a user of the terminal 720 and provides video as an execution result of the application. The application server 710 may be a server providing a cloud computing service, a virtual machine, a general personal computer that is used as a remote desktop, etc.

The application server 710 includes a communication unit 711, a virtualized input unit 712, an application execution unit 713, a virtualized output unit 714, and an encoder 715.

The communication unit 711 communicates with the terminal 720. When a user input is packetized and transmitted to the communication unit 711, the communication unit 711 may depacketize the packetized user input and then transfer the depacketized user input to the virtualized input unit 712. The virtualized input unit 712 may function as the input receiver 110 by transferring the user input to the encoder 715.

The application execution unit 713 executes the application requested by the user of the terminal 720. The application execution unit 713 may create video including a plurality of frames corresponding to the execution results of the application, while executing the application according to a user input received from the virtualized input unit 712. The created video is transferred to the encoder 715 through the virtualized output unit 714.

The encoder 715 may include a configuration similar to the image processing apparatus 600 of FIG. 6, but excluding the input receiver 630. The encoder 715 performs motion estimation based on a user input to encode video, which has been described above with reference to FIGS. 1 through 6. The encoder 715 analyzes a received user input to decide a user input pattern and initially estimates a motion vector using motion vector history information corresponding to the user input pattern in order to perform block-based motion estimation on image frames. Then, the encoder 715 decides a search location of a block matching a motion estimation block from a reference frame, using the initially estimated motion vector. The encoded video, i.e., the plurality of frames, is transferred to the terminal 720 through the communication unit 711.

The terminal 720, which a user terminal, includes a user input unit 721, a communication unit 722, a communication unit 722, a decoder 723 and a display 724.

The user input unit 721 allows a user to enter user input to be transferred to the application execution unit 713 of the application server 710. The user input unit 721 may be one of various user input devices, such as a keyboard, a mouse, a game pad, a remote controller, etc. The user input unit 721 may transfer information indicating a type of a user input device and an input value that are input by the user, to the communication unit 722.

The communication unit 722 transfers the user input received through the user input unit 721 to the application server 710. The communication unit 722 receives the encoded video from the application server 710 and transfers the encoded video to the decoder 723.

The decoder 723 decodes the encoded video and transfers the decoded video to the display 724. The display 724 may display the received video.

The terminal 720 may further include an audio decoding module and an audio output unit. The terminal 720 has no application execution module and may display the execution results of a requested application received from the application server 710.

Figure 8:
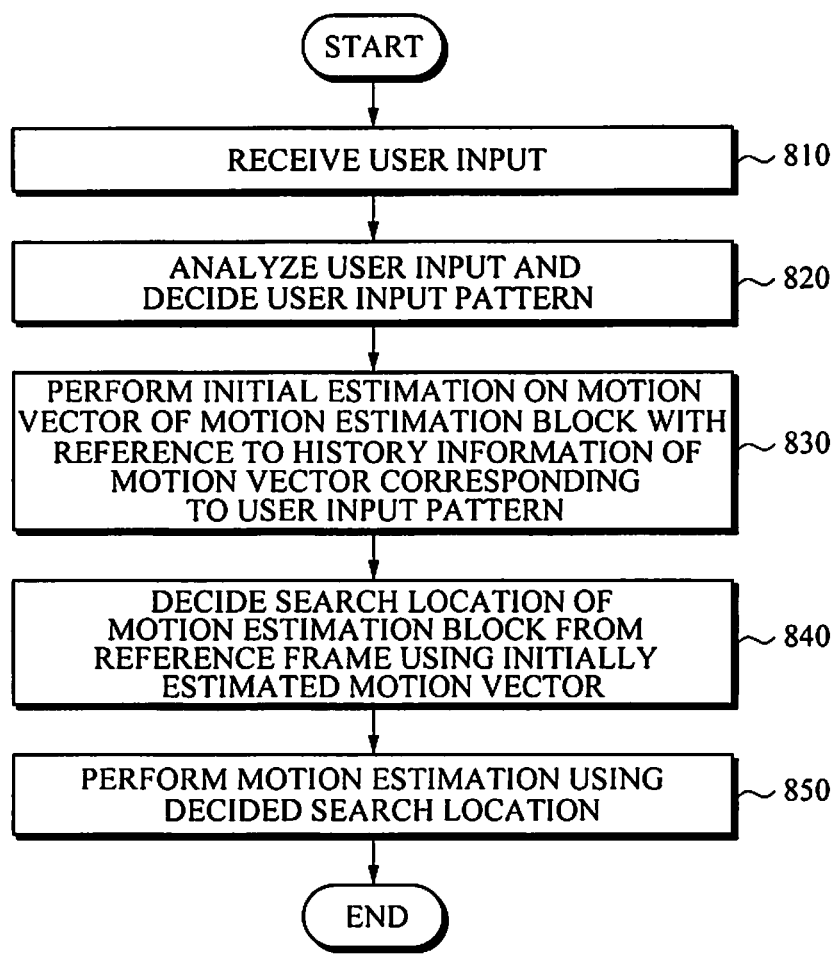
FIG. 8 is a flowchart illustrating an example of a motion estimation method according to an embodiment of the present invention.

FIG. 8 is a flowchart illustrating an example of a motion estimation method according to an embodiment of the present invention.

Referring to FIGS. 1 and 8, the input receiver 110 of the motion estimation apparatus 100 receives a user input, in step 810. The input pattern analysis unit 120 analyzes the received user input to decide a user input pattern, in step 820. The user input pattern may be analyzed as a type of a user input device and an input value according to the type of the user input device.

The motion estimator 130 performs an initial estimation of a motion vector of a motion estimation block with reference to history information of a motion vector corresponding to the user input pattern from the storage 140, which stores history information of motion vectors according to user input patterns, in step 830.

The motion estimator 130 decides a search location of a block matching a motion estimation block from a reference frame according to the initially estimated motion vector, in step 840.

The motion estimator 130 performs motion estimation using the decided search location, in step 850.

The motion estimator 130 may further store local motion vector history information representing histories of motion vectors for individual blocks and global motion vector history information representing histories of global motion vectors for individual frames, in the storage 140. The motion estimator 130 may also manage motion vector history information stored in the storage 140.

Figure 9:
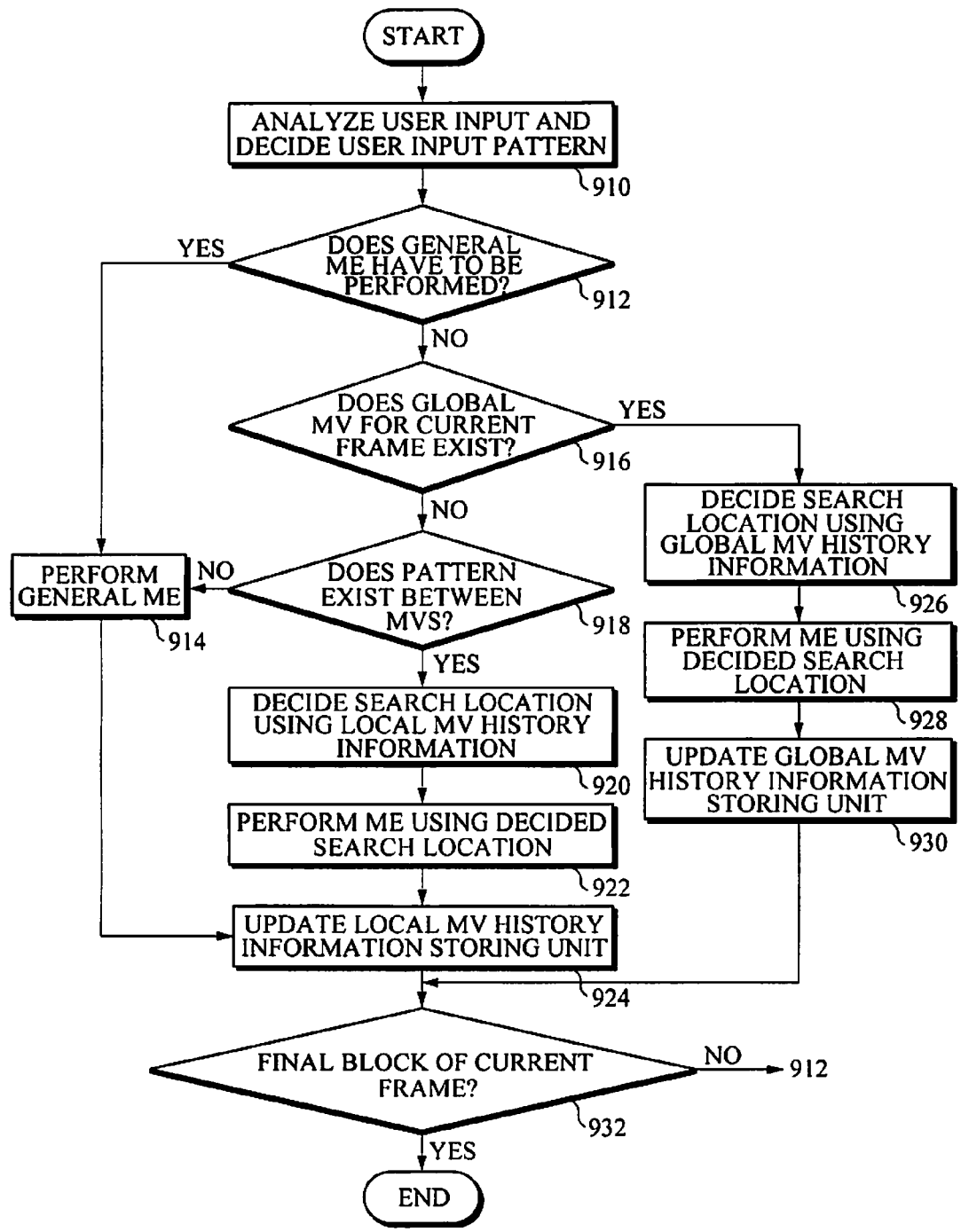
FIG. 9 is a flowchart illustrating another example of a motion estimation method according to an embodiment of the present invention.

FIG. 9 is a flowchart illustrating another example of a motion estimation method according to an embodiment of the present invention.

Referring to FIGS. 1 and 9, the input pattern analysis unit 120 of the motion estimation apparatus 100 analyzes a received user input to decide a user input pattern, in step 910. The motion estimator 130 may perform Motion Estimation (ME) based on user input or may perform general motion estimation according to a predetermined method when errors are accumulated, upon motion estimation based on user input.

Upon a determination that the motion estimator 130 must perform general motion estimation in step 912, the motion estimator 130 performs general motion estimation on a current motion estimation block, in step 914.

When the motion estimator 130 performs motion estimation based on user inputs, a determination of whether a global Motion Vector (MV) for a current frame exists is performed, in step 916. The motion estimator 130 may determine that a global motion vector for a current frame exists, when a standard deviation between motion vectors, which are obtained as the results of motion estimation performed on representative blocks predetermined for a current frame before motion estimation of a current motion estimation block, is less than or equal to a threshold value.

Upon a determination that a global motion vector exists in step 916, the motion estimator 130 decides a search location from a reference frame using global motion vector history information, in step 926. Then, the motion estimator 130 performs motion estimation using the decided search location, in step 928. Then, the motion estimator 130 updates the global motion vector history information storage 144 using the results of the motion estimation, in step 930.

Upon a determination that no global motion vector exists in step 916, the motion estimator 130 determines whether a pattern exists between a plurality of motion vectors included in the local motion vector history information, in step 918.

Upon a determination that a pattern exists between the motion vectors included in the motion vector history information, the motion estimator 130 decides a search location using the local motion vector history information in step 920, and perform motion prediction using the search location, in step 922. Then, the motion estimator 130 updates the local motion vector history information storage 142 using the results of the motion estimation, in step 922. Upon a determination that no pattern exists between the motion vectors included in the local motion vector history information in step 920, the motion estimator 130 may perform general motion estimation, in step 914.

If the current motion estimation block is determined to be a final block of a current frame in step 932, the motion estimation is terminated. However, if the current motion estimation block is not a final block, the process may return to operation 912.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, etc. The media and program instructions may be those specially designed and constructed, or they may be of the kind well-known and available to those having skill in the computer software arts. Examples of computer-readable media include magnetic media, such as hard disks, floppy disks, and magnetic tape; optical media such as Compact Disc (CD)-Read Only Memory (ROM) disks and Digital Versatile Discs (DVDs); magneto-optical media, such as optical disks; and hardware devices that are specially configured to store and perform program instructions, such as ROM, Random Access Memory (RAM), flash memory, etc. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

Several examples of embodiments of the present invention are described herein above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion estimation apparatus comprising:
an input receiver for receiving a user input;

an input pattern analysis unit for analyzing the received user input and determining a user input pattern according to the analyzed user input;

a storage for storing history information of a motion vector according to the user input pattern; and a motion estimator for initially estimating a motion vector of a motion estimation block of a current frame with reference to the history information of the motion vector corresponding to the user input pattern stored in the storage, deciding a search location of a block matching the motion estimation block from a reference frame using the initially estimated motion vector, and performing motion estimation on the motion estimation block using the decided search location.

2. The motion estimation apparatus of claim 1, wherein the user input pattern analysis unit analyzes the user input pattern based on a type of a user input device and an input value according to the type of the user input device.

3. The motion estimation apparatus of claim 1, wherein the storage comprises:

a local motion vector history information storage for storing local motion vector history information which represents histories of motion vectors for individual blocks; and a global motion vector history information storage for storing global motion vector history information that represents histories of global motion vectors for individual frames.

4. The motion estimation apparatus of claim 3, wherein the motion estimator estimates motion vectors for a predetermined number of blocks of the current frame and, when a standard deviation between the estimated motion vectors is less than a threshold value, the motion estimator determines that a global motion vector exists in the current frame, and performs initial motion estimation with reference to the global motion vector history information.

5. The motion estimation apparatus of claim 3, wherein, when a predetermined pattern is found between a plurality of motion vector values included in local motion vector history information for the block matching the motion estimation block, the motion estimator performs the initial motion estimation using the local motion vector history information.

6. The motion estimation apparatus of claim 3, wherein the motion estimator performs the initial motion estimation by assigning weights to a plurality of motion vector values included in the motion vector history information in such that larger weights are assigned to more recently updated motion vector values, and then averaging the motion vector values to which the weights have been assigned.

7. The motion estimation apparatus of claim 1, wherein the motion estimator performs motion estimation on the motion estimation block based on the search location decided from the reference frame, creates a motion vector of the motion estimation block, and stores the created motion vector as an updated motion vector in the storage.

8. The motion estimation apparatus of claim 1, wherein, when motion vector history information stored in the storage is accumulated to exceed a predetermined threshold amount, the motion estimator deletes old motion vector information from the motion vector history information.

9. An image processing apparatus comprising:

a communication unit for communicating with a terminal through a network;

a virtualized user input unit for receiving a user input transmitted from the terminal through the communication unit;

an application execution unit for executing an application according to the user input and creating a plurality of image frames; and an encoder for encoding the plurality of image frames, and performing motion estimation on each block of a current frame by analyzing the user input, determining a user input pattern according to the analyzed user input, initially estimating a motion vector of a motion estimation block of the current frame using history information of a motion vector corresponding to the user input pattern, and deciding a search location of a block matching the motion estimation block from a reference frame using the initially estimated motion vector.

10. The image processing apparatus of claim 9, wherein the communication unit transmits the plurality of encoded image frames to the terminal.

11. The image processing apparatus of claim 9, wherein the encoder comprises a storage for storing local motion vector history information that represents histories of motion vectors for individual blocks and global motion vector history information that represents histories of global motion vectors for individual frames.

12. The image processing apparatus of claim 11, wherein the encoder estimates motion vectors for a predetermined number of blocks of the current frame and, when a standard deviation between the estimated motion vectors is less than a threshold value, the encoder determines that a global motion vector exists in the current frame, and initially estimates a motion vector of the motion estimation block with reference to the global motion vector history information.

13. The image processing apparatus of claim 11, wherein when an amount of changes between a plurality of motion vector values included in local motion vector history information of the block matching the motion estimation block is less than a threshold value, the encoder initially estimates a motion vector of the motion estimation block using the local motion vector history information.

14. The image processing apparatus of claim 9, wherein the encoder performs motion estimation on the motion estimation block based on the search location decided from the reference frame, creates a motion vector of the motion estimation block, and stores the created motion vector as an updated motion vector in the storage.

15. The image processing apparatus of claim 9, wherein, when motion vector history information stored in the storage is accumulated to exceed a predetermined threshold amount, the encoder deletes old motion vector information from the motion vector history information.

16. A motion estimation method comprising:

receiving a user input;

analyzing the received user input;

determining a user input pattern according to the analyzed user input;

initially estimating a motion vector of a motion estimation block of a current frame with reference to history information of a motion vector corresponding to the user input pattern, wherein the user input pattern is stored in a storage that stores motion vector history information according to user input patterns;

deciding a search location of a block matching the motion estimation block from a reference frame, using the initially estimated motion vector; and performing motion estimation on the motion estimation block using the decided search location.

17. The motion estimation method of claim 16, wherein analyzing of the user input pattern comprises analyzing the user input pattern based on a type of a user input device and an input value according to the type of the user input device.

18. The motion estimation method of claim 16, further comprising:
   storing local motion vector history information which represents histories of motion vectors for individual blocks, in the storage; and
   storing global motion vector history information that represents histories of global motion vectors for individual frames, in the storage.

19. The motion estimation method of claim 18, wherein the initial estimating of the motion estimation bock comprises estimating motion vectors for a predetermined number of blocks of the current frame and determines, when a standard deviation between the estimated motion vectors is less than a threshold value, that a global motion vector exists in the current frame, and performs initial motion estimation with reference to the global motion vector history information.

20. The motion estimation method of claim 18, wherein the initial estimating of the motion estimation block comprises performing, when a predetermined pattern is found between a plurality of motion vector values included in local motion vector history information for the block corresponding to the motion estimation block, initial motion estimation using the local motion vector history information.

* * * * *